Aug. 2, 1927.
T. O. LILES
1,637,867
TESTING DEVICE FOR INTERNAL COMBUSTION ENGINES
Filed June 23, 1927    2 Sheets-Sheet 2
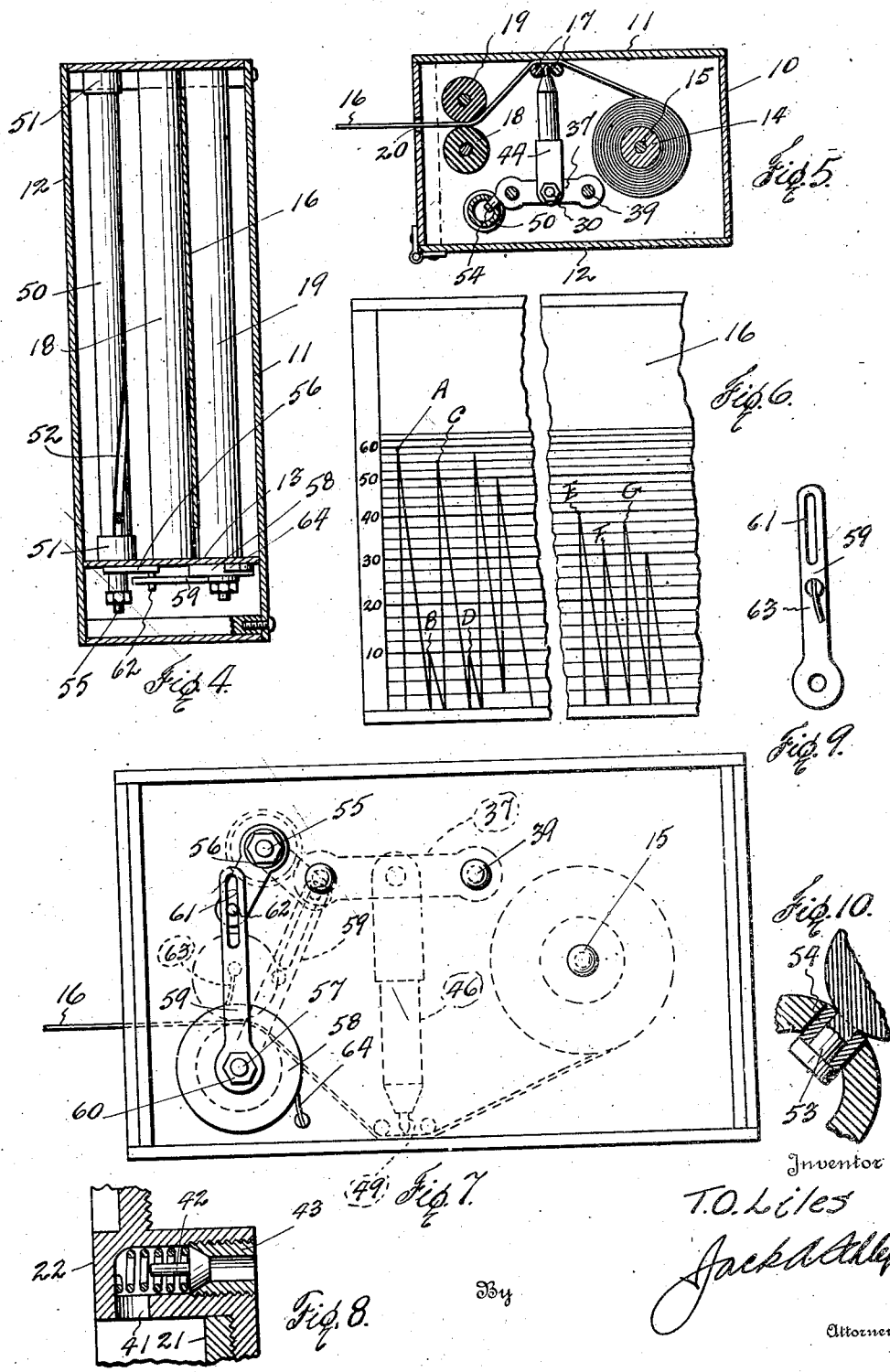
Inventor
T. O. Liles
By Jack A. Athey
Attorney Patented Aug. 2, 1927.

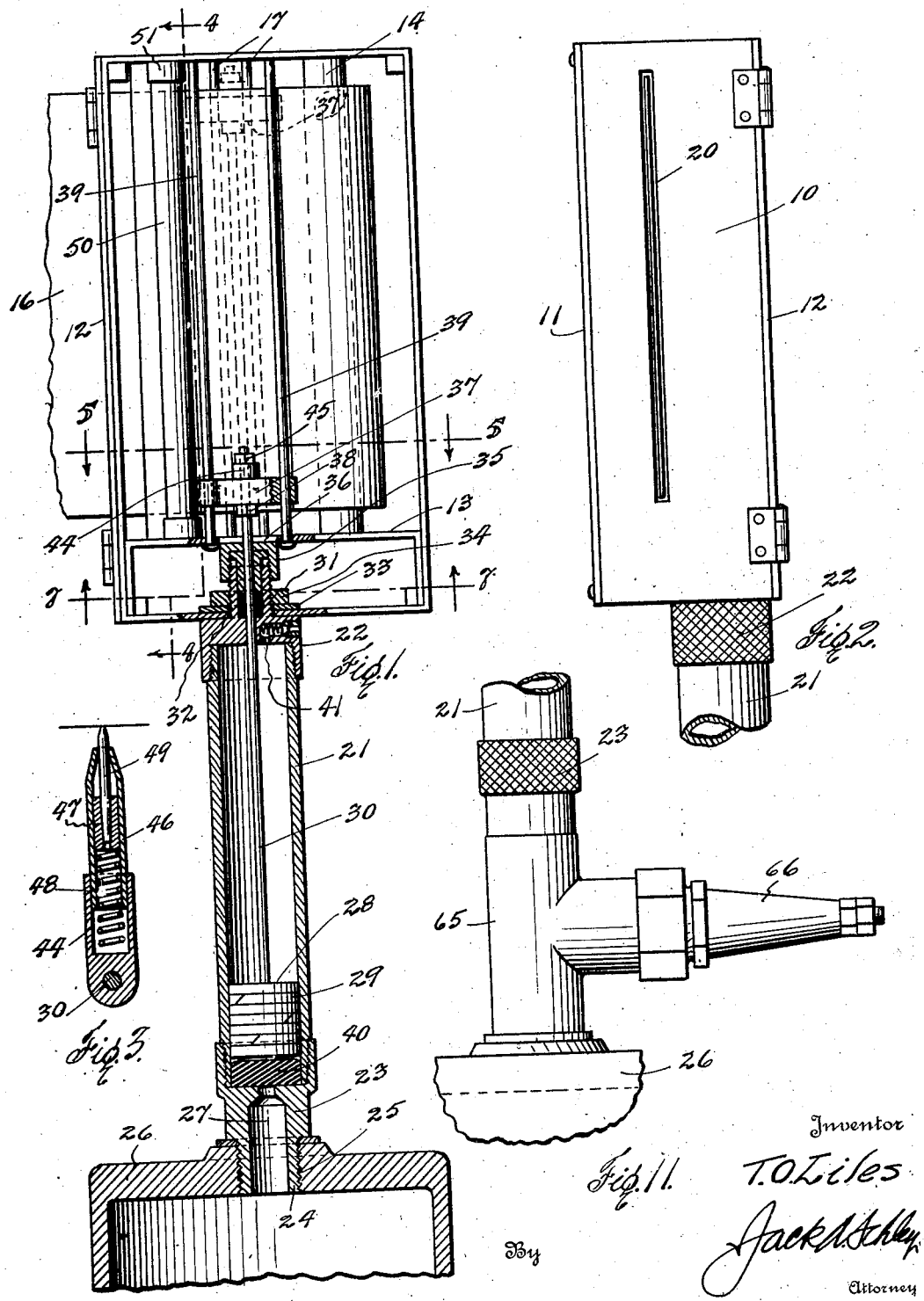

1,637,867

UNITED STATES PATENT OFFICE.

THOMAS O. LILES, OF TYLER, TEXAS, ASSIGNOR, BY DIRECT AND MESNE ASSIGNMENTS, OF THREE-EIGHTHS TO DUKE C. MATTHEWS AND FOUR-EIGHTHS TO BRODIE H. ASHBY, BOTH OF DALLAS, TEXAS.

TESTING DEVICE FOR INTERNAL-COMBUSTION ENGINES.

Application filed June 23, 1927. Serial No. 200,909.

This invention relates to new and useful improvements in testing devices for internal combustion engines.

One object of the invention is to provide a device for connection with the cylinder of an internal combustion engine equipped with means for recording and charting the pressure of the exploded charges within the cylinder, whereby the horse power may be determined and also whereby the back-pressure created in the cylinder during the exhaust stroke of the piston may be recorded and charted.

A further object of the invention is to provide a device for connection with the cylinder of an internal combustion engine equipped with means for recording and charting the compression within said cylinder.

A particular object of the invention is to provide a device for connection with the cylinder of an internal combustion engine equipped with means for visibly indicating and charting the cycles and individual strokes of the piston in said cylinder, whereby irregularities in the firing, improper functioning of the valves and other imperfections may be readily ascertained in a definite and positive manner.

An important object of the invention is to provide a device for testing internal combustion engines arranged to be operated solely by pressure and being free from compression or expansion springs and the like.

A construction designed to carry out the invention will be hereinafter described, together with other features of the invention.

The invention will be more readily understood from a reading of the following specification and by reference to the accompanying drawings, in which an example of the invention is shown and wherein:

Fig. 1 is a view of a testing device constructed in accordance with the invention and mounted on an engine cylinder, parts being shown in elevation and parts in section.

Fig. 2 is a side elevation of the upper portion of the device,

Fig. 3 is a sectional view of the marking device,

Fig. 4 is a vertical sectional view taken on the line 4—4 of Fig. 1,

Fig. 5 is a horizontal sectional view on line 5—5 of Fig. 1,

Fig. 6 is a face view of a portion of the recording strip,

Fig. 7 is an enlarged horizontal cross-sectional view taken on the line 7—7 of Fig. 1, and looking in the direction of the arrows, Fig. 8 is an enlarged sectional view showing the air releasing valve, Fig. 9 is a detail of the strip-feeding actuator, Fig. 10 is a detail of the detent rolled, and Fig. 11 is a side elevation of the spark plug connection.

In the drawings the numeral 10 designates an upright rectangular frame having a back plate 11 removably secured thereon and a front or cover plate 12 hinged thereon, whereby an enclosed casing or housing is provided. Within the frame is fastened a bridge or other support 13 which is spaced above the bottom.

Within the frame is mounted a vertical feed roller 14 having a shaft 15 suitably journaled in the bridge and top of the frame so that the roller may be removed. A recording strip 16 of paper or other suitable material and which will be hereinafter described in detail, is wound into a roll about the roller 14. This strip is fed from the roller and passed between the back plate 11 and a pair of vertical guide rods 17 spaced apart sufficiently for the reception of a marking instrument therebetween.

A pair of vertical rollers 18 and 19, respectively, are suitably journaled in the bridge and top of the frame. These rollers may have rubber jackets or suitably finished faces for engaging and propelling the strip 16 therebetween. A vertical slot 20 is provided in one side of the frame and the strip 16 after passing between said rollers is projected through this slot. Means which will be hereinafter described is provided for intermittently rotating the roller 19, whereby a step by step travel will be imparted to the said strip. The roller 18 acts as a guide and pressure roller for holding the strip in engagement with the roller 19.

A vertical compression cylinder 21 has a cap 22 screwed onto its upper end and a cap 23 screwed onto its lower end. The cap 23 has a reduced screw-threaded nipple 24 for screwing into the spark plug opening 25 of the engine cylinder 26. The cap 23 has a central bore 27 for establishing a fluid passage from the cylinder 26 to the compression cylinder 21. It is important that the cylinder 21 has an accurate bore so that a piston 28 may have a snug sliding fit therein. The piston is provided with a plurality of rings 29 and must be made so that air compressed above the piston in the said cylinder can not escape downwardly around said piston.

A piston rod 30 extends upwardly from the piston through the cap and also through a stuffing-box 31. The stuffing-box extends through an opening 32 in the bottom of the frame and receives a washer 33 and a nut 34 whereby the frame is securely mounted on the cap 22, as is shown in Fig. 1. A compression nut 35 is fastened on top of the box, being applied through a hole 36 in the bridge 13. The piston rod 30 extends upwardly through the nut 35 and has mounted on its upper end a cross-head 37 which rests upon a nut 38. The cross-head is apertured so as to receive and slide vertically upon pilot rods 39 secured in the bridge and the top of the frame.

It will be seen that fluid pressure entering the cylinder 21 through the bore 27 will elevate the piston 28 whereby the rod 30 will be moved upwardly and the cross-head 37 also carried upwardly on the rods 39. Upon the down stroke of the piston (not shown) in the engine cylinder 26 either the stored compression or the suction created and acting through the bore 27 will move the piston 28 downwardly, thus returning the parts to the starting point. A cushion disk 40 of rubber or other suitable material is placed under the piston 28 to cushion its down stroke.

As before pointed out, all parts of the device must work accurately and, therefore, an air release for the cylinder 21 above the piston 28 must be provided, and for this purpose any suitable means may be used. I have shown an L-shaped duct 41 in the cap 22 counterbored to receive a spring pressed valve 42 seating against a sleeve 43 screwed into the outer end of the duct, as is best shown in Fig. 8. Upon the upper stroke of the piston 28 the valve 42 will seat, but upon a down stroke of said piston the valve will open, thus admitting air and freeing the piston from a retarding influence.

On the upper end of the rod 30 I secure the barrel 44 of a marker by means of a nut 45. A sleeve 46 is secured into the barrel and has its outer end tapered. As is shown in Fig. 3, a plunger 47 is mounted to slide in said sleeve and is urged toward the reduced end by a coiled spring 48. A piece of marking lead 49 wedged into the plunger projects through the reduced end of the sleeve so as to engage the surface of the strip 16 between the rods 17, as is shown in Fig. 5. It is obvious that as the cross-head 37 is moved up and down during the reciprocations of the piston 28, the lead 49 will mark a line on the strip, as is indicated in Fig. 6. This line will extend up and down the chart indicating the peak of each stroke. While I have shown a marking lead in the structure illustrated in Fig. 3, it is to be understood that any suitable marking, tracing, or recording medium may be attached to the cross-head.

Numerous devices could be worked out for imparting rotation to the roller 19 to propel the paper strip 16. Satisfactory results have been had with the mechanism illustrated in detail in Figs. 7 and 9. This mechanism includes a tubular sleeve 50 journaled at its ends in collars 51 carried by the bridge 13 and the top of the frame. This sleeve is provided with a helical slot 52 and the cross-head 37 has a detent 53 extending into the said slot and provided with a roller 54 for engaging the edges of said slot and reducing friction. It will be seen that as the cross-head is reciprocated vertically, the sleeve 50 will be given reverse rotations.

The sleeve 50 has an axial stud 55 depending through the bridge 13 and an arm 56 (Figs. 4 and 7) is fastened on said stud so as to be swung when the sleeve is rotated. The roller 19 has a stud 57 depending through the bridge and a circular disk or rotor 58 is fastened on said stud so as to rotate the roller 19 when actuated. An actuating lever 59 is pivotally confined on the stud 57 by a nut 60 and is provided at its outer end with a slot 61 receiving a pin 62 carried by the arm 56.

A flat spring detent 63 mounted on the lever has its outer end engaging the periphery of the disk 58 at one side of the longitudinal axis of the lever so that, as is indicated in Fig. 7, the disk will be rotated when the lever is swung in one direction, but will not be rotated when the lever is swung in the opposite direction, because of a retaining spring 64 engaging the periphery of said disk. As is shown in Fig. 7, and as is indicated in Fig. 4, the rotation of the roller 19 (Fig. 5) is carried out upon the down stroke of the cross-head 37 during which the lever 59 moves from the position shown in dotted lines in Fig. 7 to the position shown in full lines in said figure. Upon the up stroke of the cross-head the lever 59 is swung back for further operation.

Where the device is operated with the cylinder firing it is screwed into a T-connection 65 which in turn is screwed into the spark plug opening 25 of the cylinder 26, as is shown in Fig. 11. The usual spark plug 66 is screwed into the T-connection also. In operating the device on a 4-cycle engine, the piston 28 would be forced upwardly in the cylinder 21 during the compression stroke of the engine piston, whereby the barrel 44 of the marker will be carried upwardly and the lead 49 caused to trace a line on the face of the recording strip 16. The piston 28 would be moved upwardly until the compression above it in the cylinder 21 equaled the compression in the cylinder 26 and this would limit the upward compression stroke of the marker. However, upon the explosion of the charge, the piston 28 and the marker would be forced still further upwardly.

In Fig. 6 I have shown the strip 16 calibrated with longitudinal lines, each diagrammatically indicating measurements of pressure. The mark traced by the lead 49 extends from the lowest line on the chart to the line 60 where the peak A indicates the top of the compression and explosion stroke. The mark traced during the compression stroke would not reach the peak A until the explosion had taken place. The piston 28 would be drawn downward during the power stroke while the piston in the engine cylinder is traveling downward. This would trace the mark to the bottom of the chart.

Upon the next upward stroke of the piston in the cylinder 26, the exhaust valve would be open for the purpose of carrying off the exhaust gases. In a great many engines the exhaust valve is not large enough to carry off all of the spent gases and, therefore, a certain amount of back pressure is built up in the engine cylinder by compression. In such case the piston 28 would be elevated in the cylinder 21. It is common for such back pressure to register several pounds, therefore, the mark would be traced to the peak B at the line 10, shown in Fig. 6. The mark would then be traced to the bottom of the chart on the intake stroke of the engine piston. The next movement of the piston would be the compression and explosion stroke and if the motor or engine was losing compression, either through the piston rings or through the valves, or otherwise, and the compression was below normal, the mark would be traced to the peak C, and in such case the back pressure peak D would probably not be as high as the peak B.

This operation would be rapidly repeated during the running of the motor and the variations in the pressures in the cylinder 26 would thus be indicated on the chart. The chart would enable a mechanic to ascertain just what the trouble with the motor happened to be and he would, therefore, be relieved of the obligation of guessing. Many faulty conditions could be ascertained which would otherwise require the engine to be taken down. Irregularities in firing would show up on the chart because the mark would not be traced to as high a peak, if the motor failed to fire, as if it did. If it was desired to test the engine merely for compression, the ignition wire (not shown) could be disconnected from the spark plug 66 or the nipple 24 could be screwed into the spark plug opening 25, as is shown in Fig. 1. Then upon turning the engine over by hand or otherwise, the marker would be forced upward upon the compression stroke, but it would probably not go any higher than the peak E, which is shown on the chart in Fig. 6 at the line indicating 40, which would be normal compression. If the compression was weak it might vary, going to the peak F on one stroke and indicating 32, and perhaps rising to the peak G on the next stroke and indicating a pressure of 38. If the loss of compression was due to valve trouble, this could be corrected and if testing did not show a normal compression, then the mechanic would know that the trouble was with the rings or some other cause.

Only a few reciprocal marks have been shown on the chart but it is to be understood that the test may be continued through a period of sufficient length to produce a graphic reading of the cycles of the engine. The chart is merely diagrammatical as it is not possible to show scale drawing.

Various changes in the size and shape of the different parts, as well as modifications and alterations, may be made within the scope of the appended claims.

What I claim, is:

1. In a testing device for internal combustion engines, a compression cylinder for connection at one end to the cylinder of an internal combustion engine for admitting fluid pressure from the engine cylinder, means cooperating with the compression cylinder for compressing a fluid medium at the end thereof opposite the engine connection, and means controlled by the aforesaid means for indicating pressure variations in the engine cylinder.

2. In a testing device for internal combustion engines, a compression container for connection at one end to the cylinder of an internal combustion engine for admitting fluid under pressure from the engine cylinder, means in the container actuated by the admitted pressure fluid for building up compression in the container at the end thereof opposite the engine connection equal in pressure to the compression built up in the engine cylinder, and indicating means having an actuator connected with the container and controlled by the compression therein for indicating the amount of compression built up in the engine cylinder.

3. In a testing device for internal combustion engines, a compression container for connection at one end to the cylinder of an internal combustion engine for admitting fluid under pressure from the engine cylinder, means in the container actuated by the admitted pressure fluid for building up compression in the container at the end thereof opposite the engine connection equal in pressure to the compression built up in the engine cylinder, and indicating means having an actuator connected with the container and controlled by the compression therein for charting the explosive force or compression in the engine cylinder during consecutive cycles.

4. In a testing device for internal combustion engines, a compression container for connection at one end to the cylinder of an internal combustion engine for admitting fluid under pressure from the engine cylinder, means in the container actuated by the admitted pressure fluid for building up compression in the container at the end thereof opposite the engine connection equal in pressure to the compression built up in the engine cylinder, and indicating means connected with and actuated by the compression building means of the container.

5. In a testing device for internal combustion engines, a compression container for connection at one end to the cylinder of an internal combustion engine for admitting fluid under pressure from the engine cylinder, means in the container actuated by the admitted pressure fluid for building up compression in the container at the end thereof opposite the engine connection equal in pressure to the compression built up in the engine cylinder, recording means including a marker connected with and actuated by the compression building means of the container, a recording medium traversed by said marker calibrated to indicate pressure values, and means for propelling the recording medium.

6. In a testing device for internal combustion engines, a compression cylinder having means at one end for connection to the cylinder of an internal combustion engine and at its opposite end closed against internal pressure, a piston in the compression cylinder actuated by the pressure fluid admitted from the engine cylinder, and recording means actuated by the piston and controlled by the compression in the cylinder to compress a fluid medium at the closed end of the compression cylinder for recording the pressures in the engine cylinder during the successive cycles of the piston thereof.

7. In a testing device for internal combustion engines, a compression cylinder having means at one end for connection to the cylinder of an internal combustion engine, a piston in the compression cylinder actuated by the pressure fluid admitted from the engine cylinder, recording means actuated by the piston and controlled by the compression in the cylinder for recording the pressures in the engine cylinder during the successive cycles of the piston thereof, and means for relieving air suction in the compression cylinder upon the back stroke of the piston thereof.

8. In a testing device for internal combustion engines, a compression cylinder having means at one end for connection to the cylinder of an internal combustion engine and at its opposite end closed against internal pressure, a piston in the compression cylinder actuated by the pressure fluid admitted from the engine cylinder, a piston rod extending from the piston through the opposite end of the cylinder to compress a fluid medium at the closed end of the compression cylinder, a recording medium supported adjacent the piston rod, and a marker actuated by the piston rod and traversing the recording medium.

9. In a testing device for internal combustion engines, a compression cylinder having means at one end for connection to the cylinder of an internal combustion engine, a piston in the compression cylinder actuated by the pressure fluid admitted from the engine cylinder, a piston rod extending from the piston through the opposite end of the cylinder, a recording medium supported adjacent the piston rod, a marker actuated by the piston rod and traversing the recording medium, and means operated by the piston rod for propelling the recording medium to move it progressively as the marker is reciprocated by the piston rod.

10. In a testing device for internal combustion engines, a compression cylinder having means at one end for connection to the cylinder of an internal combustion engine, a piston in the compression cylinder actuated by the pressure fluid admitted from the engine cylinder, a piston rod extending from the piston through the opposite end of the cylinder, a reciprocating member attached to the piston rod, a support in which said member is mounted, a marker carried by the said member, a recording strip mounted on the support and engaged by the marker, and means actuated by the reciprocating member for propelling the recording strip.

11. In a testing device for internal combustion engines, a compression cylinder having means at one end for connection to the cylinder of an internal combustion engine, a piston in the compression cylinder actuated by the pressure fluid admitted from the engine cylinder, a piston rod extending from the piston through the opposite end of the cylinder, a reciprocating member attached to the piston rod, a support in which said member is mounted, a marker carried by the said member, a recording strip mounted on the support and engaged by the marker, a propelling roller engaging said strip for propelling it, an actuator operated by the reciprocating member, and means operated by the actuator for rotating the roller.

12. In a testing device for internal combustion engines, a container for connection at one end to the cylinder of an internal combustion engine for admitting fluid under pressure from the engine cylinder, means in the container actuated by the admitted pressure fluid for building up compression in the container at its end opposite the engine connection equal in pressure to the compression built up in the engine cylinder and further actuated by the explosion of the compressed charge in the engine cylinder to build up further compression in the container, and indicating means having an actuator connected with the container and controlled by the built-up compression therein for indicating the full force of the explosion in the engine cylinder.

13. In a testing device for internal combustion engines, a container for connection at one end to the cylinder of an internal combustion engine for admitting fluid under pressure from the engine cylinder, means in the container actuated by the admitted pressure fluid for building up compression in the container at its end opposite the engine connection equal in pressure to the compression built up in the engine cylinder and further actuated by the explosion of the compressed charge in the engine cylinder to build up further compression in the container, an actuator connected with and actuated by the said means in the container, and an indicator operated by said actuator for indicating the variations in pressure during the compression, explosion, and exhaust cycles of the engine.

In testimony whereof I affix my signature.

THOMAS O. LILES.